(12) United States Patent  
Horvitz

(10) Patent No.: US 7,548,904 B1  
(45) Date of Patent: Jun. 16, 2009

(54) UTILITY-BASED ARCHIVING

(75) Inventor: Eric J. Horvitz, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 294 days.

(21) Appl. No.: 11/286,667

(22) Filed: Nov. 23, 2005

Related U.S. Application Data

(63) Continuation of application No. 09/894,392, filed on Jun. 28, 2001, now Pat. No. 7,043,506.

(51) Int. Cl.
*G06F 13/30* (2006.01)

(52) U.S. Cl. ............................ 707/2; 709/204; 711/161

(58) Field of Classification Search ........................ None
See application file for complete search history.

(56) References Cited

U.S. PATENT DOCUMENTS

| | | | |
|---|---|---|---|
| 5,193,171 A * | 3/1993 | Shinmura et al. ........... 711/113 |
| 5,333,266 A | 7/1994 | Boaz et al. |
| 5,377,354 A | 12/1994 | Scannell et al. |
| 5,493,692 A | 2/1996 | Theimer et al. |
| 5,544,321 A | 8/1996 | Theimer et al. |
| 5,555,376 A | 9/1996 | Theimer et al. |
| 5,603,054 A | 2/1997 | Theimer et al. |
| 5,611,050 A | 3/1997 | Theimer et al. |
| 5,619,648 A | 4/1997 | Canale et al. |
| 5,765,170 A | 6/1998 | Morikawa |
| 5,812,865 A | 9/1998 | Theimer et al. |
| 5,829,023 A * | 10/1998 | Bishop ........................ 711/118 |
| 5,832,522 A | 11/1998 | Blickenstaff et al. |

(Continued)

FOREIGN PATENT DOCUMENTS

WO  9800787  1/1998

OTHER PUBLICATIONS

Andy Harter, et al., A Distributed Location System for the Active Office, IEEE Network, 1994, pp. 62-70.

(Continued)

*Primary Examiner*—Charles Rones
*Assistant Examiner*—Yuk Ting Choi
(74) *Attorney, Agent, or Firm*—Wolf, Greenfield & Sacks, P.C.

(57) ABSTRACT

A system and associated methodology is provided that is adapted to infer what to do with an item, and more particularly whether to archive and/or keep active an item in a more active, easy-to-access store based upon a cost-benefit analysis. The cost-benefit analysis determines the overhead associated with keeping the item active (e.g., not archiving it) versus the gains in connection with having quick and easy access to the item. The cost of maintaining an item in an active state is measured in terms of the size of the item which, in turn, affects the amount of space needed to store it. The benefit of keeping the item active is measured in terms of a probabilistic determination describing how a user will access the item in the future, which is a reflection of the utility of the item in an accessible state. The invention leverages notions of temporal sensitivity of the likelihood that an item will be needed in the future such that determined values and inferences can be dynamically updated over time. Items having a small probability of being accessed again after an initial review are categorized as one-shot items.

19 Claims, 11 Drawing Sheets

U.S. PATENT DOCUMENTS

| | | | |
|---|---|---|---|
| 6,067,565 A * | 5/2000 | Horvitz | 709/218 |
| 6,149,316 A | 11/2000 | Harari et al. | |
| 6,161,130 A | 12/2000 | Horvitz et al. | |
| 6,199,103 B1 | 3/2001 | Sakaguchi et al. | |
| 6,226,630 B1 | 5/2001 | Billmers | |
| 6,233,575 B1 | 5/2001 | Agrawal et al. | |
| 6,249,805 B1 | 6/2001 | Fleming, III | |
| 6,282,565 B1 | 8/2001 | Shaw et al. | |
| 6,466,232 B1 | 10/2002 | Newell et al. | |
| 6,484,197 B1 | 11/2002 | Donohue | |
| 6,513,046 B1 | 1/2003 | Abbott, III et al. | |
| 6,549,915 B2 | 4/2003 | Abbott, III et al. | |
| 6,592,627 B1 | 7/2003 | Agrawal et al. | |
| 6,625,620 B1 * | 9/2003 | Tagg | 707/200 |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 7,043,506 B1 * | 5/2006 | Horvitz | 707/204 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0147734 A1 | 10/2002 | Shoup et al. | |
| 2003/0046401 A1 | 3/2003 | Abbott et al. | |
| 2003/0154476 A1 | 8/2003 | Abbott, III et al. | |
| 2005/0034078 A1 | 2/2005 | Abbott et al. | |

OTHER PUBLICATIONS

Guanling Chen, et al., A Survey of Context-Aware Mobile Computing Research. Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitons Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Compuring Objects, IEEE Transactions on Consmuer Electronics, 1992, 11 pages, vol. 38—No. 1.

Bill N. Schilit. et al., The PartTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerarions for Scalable, Secure, Mobile Computing with Location Information. In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communicarions of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

K. Poh, et al., Dynamic Construction and Refinement of Utility-based Categorization Models, IEEE Trans. Sys. Man Cyb., 24(11), 1994, 33 pages.

E. Horvitz, et al., Utility-based Abstraction and Categorization, Proceedings of the 9th Conference on Uncertainty in Artificial Intelligence, Jul. 1993, Morgan Kaufmann: San Francisco, pp. 128-135.

Stephen Pollock, A Rule-based Message Filtering System, ACM Transactions on Information Systems, vol. 6 Issue 3, pp. 232-254, 1988.

Richard J. Cox, Researching Archival Reference as an Information Function: Observations on Needs and Opportunities. American Library Association, vol. 31 No. 3, Mar. 1992, pp. 387-397.

Berchtold, et al., SaveMe: A System for Archiving Electronic Documents Using Messaging Groupware, Proceedings of the Int'l Joint Conference on Work Activities Coordination and Collaboration, pp. 167-176, Mar. 1999, ACM Press.

Eric Horvitz, Continual Computation Policies for Utility-Directed Prefetching, Proceedings of the 7th Int'l Conference on Information and Knowledge Management, pp. 175-184, Nov. 1998, ACM Press.

Eric Horvitz; "Continual Computation Policies for Utility-Directed Prefetching"; Sep. 1996; ACM; pp. 175-184.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

OA Dated Jul. 18, 2008 for U.S. Appl. No. 11/869,683, 33 pages.

* cited by examiner

UTILITY-BASED ARCHIVING

CROSS-REFERENCE TO RELATED APPLICATIONS

This application is a continuation of co-pending U.S. patent application Ser. No. 09/894,392, filed on Jun. 28, 2001, entitled "UTILITY-BASED ARCHIVING." This application is also related to U.S. patent application Ser. No. 10/869,863, filed on Jun. 16, 2004, entitled, "UTILITY-BASED ARCHIVING." The entireties of which are incorporated herein by reference.

BACKGROUND

Computer systems and related technologies have become a staple in many aspects of modern society. People have come to rely on these systems as a tool for use in both personal and professional lives. These technologies have, among other things, provided for increased communication and sharing of information among individuals and entities. For instance, computer systems and related technologies are currently used in conjunction with the Internet and local area networks to enable people to access, receive, generate and share unprecedented amounts of data (e.g., documents, spread sheets, presentations, Internet files and email).

While individuals and society as a whole benefit from such free flow of information, there are costs associated with managing such data. Moreover, these costs generally grow as the volume of shared information increases. Accordingly, since more and more information continues to be created and circulated among a greater number of users, an important use of computer systems and related technologies is that of data management.

With respect to email messages, for example, an individual may be inundated with a large number of new email messages. As such, a user may be required to spend significant time and energy reviewing, responding to, organizing and/or sorting through these messages. Moreover, the number of email messages received is often inversely proportional to the amount of time available. For example, a manager who oversees many employees may have very little time to sort through, organize and/or respond to a significant amount of email messages. However, such an individual tends to fall within a group that receives a disproportionately large number of email messages. Some of the manager's email messages may contain information that is of interest (e.g., status reports for ongoing projects). As such, the manager may wish to review these messages one or more times. Other messages may, instead, contain irrelevant information (e.g., unsolicited junk mail). In this case, the manager may wish to spend as little time as possible dealing with these messages and, therefore, would prefer that these messages be discarded immediately. Unfortunately, conventional systems generally do not provide for automatically discarding irrelevant messages and/or prioritizing messages based upon relevance—the messages are not sorted based upon their respective values and sizes. To date, systems and methodologies merely archive messages based upon chronology. Moreover, these systems usually require some type of consent before items can be discarded. As an example, a user is often asked whether it is appropriate to update a list of messages (e.g., whether to archive one or more less relevant messages).

Since information will increasingly be propagated among individuals, managing of such information becomes more of an issue. While it may be desirable to indefinitely maintain all relevant items in an active state so that they can be quickly and easily accessed, technological realities limit the number of items that can be maintained in such a state. More particularly, computer systems have memory limitations. Fast memory that allows computer systems to maintain items in an active state is more limited than slower archival memory. Fast memory is, therefore, generally more expensive than archival memory, making it more costly to store an item in an active state. Moreover, sorting through vast amounts of items in an active state becomes very laborious (e.g., some individuals have thousands of e-mails in an active state)—thus creating a need for streamlining of active items.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides a system and methodology operable to infer or approximate what to do with an item. In one example, a value density is used for item ordering, which yields an approximation for choosing the best assortment of items of different sizes and values for storing in a limited space (e.g. limited memory). The value density is obtained via a cost-benefit analysis to infer whether a user would prefer to archive, store as active or discard an item (e.g., e-mail, text, document, web page, image, audio). The invention provides for streamlining the number of items stored as active in order to facilitate ease of review, access and searching of items. In the cost-benefit analysis, overhead attributable to keeping the item active is compared to gains associated with having quick and easy access to the item. A value density is thereby obtained as a measurement of the worth of the item given its size and utility. The value density provides a basis for comparing one item to another such that a decision can be made as to which items to maintain in an active state. Given a finite amount of active space within which to maintain items, items having greater value densities can be actively retained. In this manner, inefficient utilization of active space can be mitigated.

The system and associated methodology of the present invention are adaptable to computer related applications including, but not limited to, email and document retention systems. Since there is a limited amount of active memory on computer systems, the cost of maintaining an item in an active state is measured in terms of the item's size. The benefit of keeping the item in an active state is measured in terms of a probabilistic determination that a user will access the item. The output of a probabilistic determination is a reflection of the relevance and utility of an item. In accordance with an aspect of the present invention, notions of temporal sensitivity of the likelihood that an item will be needed in the future can be leveraged, such that probabilistic determinations can continually be updated over time. As such, measurements of the utility of items and inferences drawn therefrom may be ongoing.

According to another aspect of the present invention, an item can be classified as either an item that will be accessed more than once or just a single time. An item that will be accessed only a single time is referred to as a "one-shot" item. A one-shot item can be archived after it is viewed since it is not likely to be accessed again. For example, if the item happens to be a short email message (e.g. "see you later") sent in response to user initiated dialog by an entity with which the user frequently corresponds, it may be regarded as a one-shot message and be discarded or archived after it is reviewed. An item can be branded a one-shot item based upon its determined probability and/or value density. For instance, if a determined probability/value density is less than a threshold probability/value density, an item may be regarded as a one-shot item (e.g. probability item will be read more than once is less than 0.5). Alternatively, an item may be branded as a one-shot item if its determined probability/value density changes by more than a certain amount within a given period of time.

According to still another aspect of the present invention, a learning system can act upon an inference system to adjust inferences made thereby. For instance, the learning system can modify the manner within which the inference system decides that an item is to be regarded as a one-shot item.

An interactive user interface ("UI") is provided that allows a user to personalize how items are stored, including how probabilistic and inferential determinations are made.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION

Figure 1:
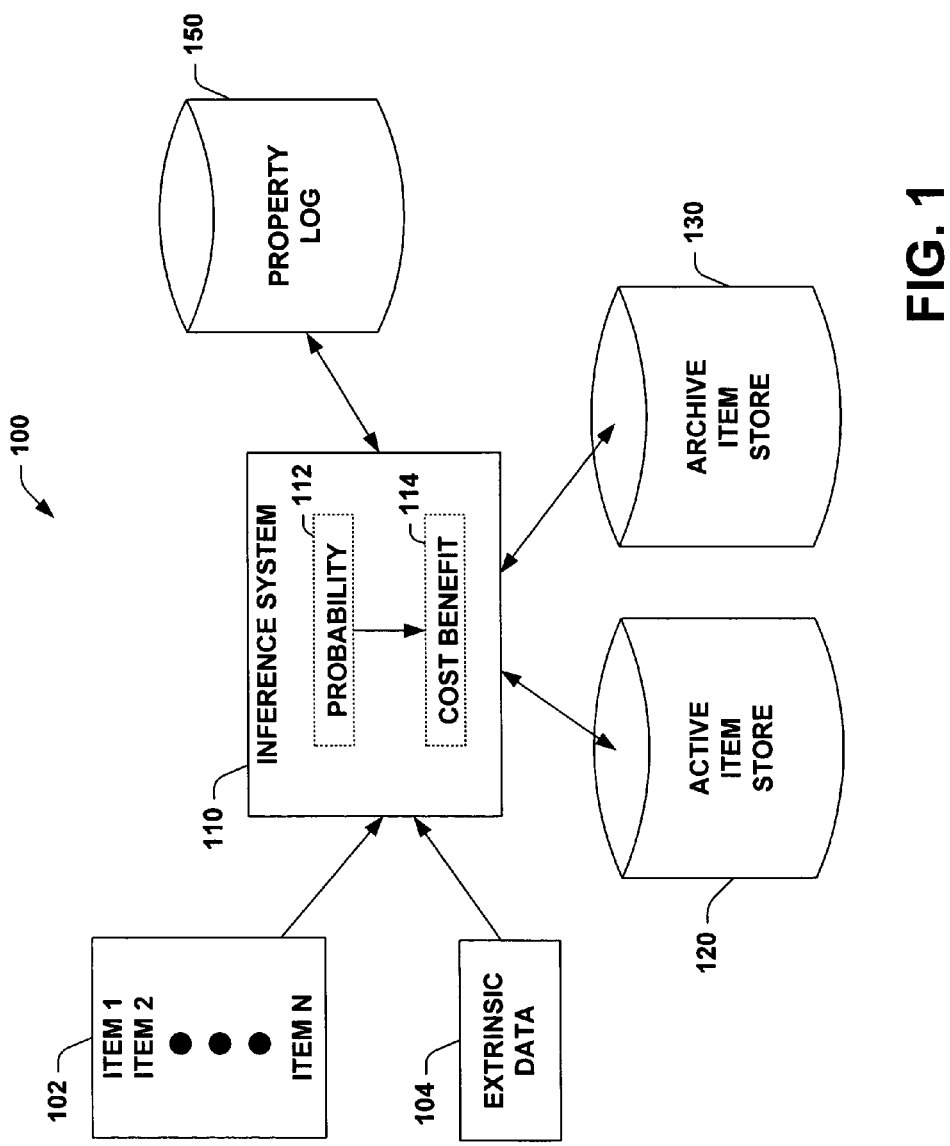
FIG. 1 is a schematic diagram illustrating a system that provides for inferring whether to actively store an item in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. Moreover, well-known structures and devices are illustrated in some instances in block diagram form in order to facilitate description of the present invention.

The present invention relates to a system and associated methodology adapted to infer what to do with an item, and more particularly whether to archive and/or keep active an item based upon a cost-benefit analysis. The cost-benefit analysis determines the overhead associated with keeping the item active (e.g., not archiving it) versus the gains in connection with having quick and easy access to the item. The cost of maintaining an item in an active state is measured in terms of the size of the item which, in turn, affects the amount of space needed to store it. The benefit of keeping the item active is measured in terms of a probabilistic determination that a user will access the item, which is a reflection of the relevance and utility of the item. The invention contemplates temporal sensitivity such that determined values and inferences can be dynamically updated over time.

Referring initially to FIG. 1, a system 100 is illustrated that provides for inferring whether to keep active, delete or archive items 102 numbered 1 through N (N being an integer). An inference system 110 receives the items 102 and makes an inference as to how a user would like to store the respective items 102. The inference system 110 may also receive and utilize extrinsic data 104 to decide how to store the items. An active item store 120 is employed to store items in an active state, while an archive item store 130 can be utilized to retain certain items in an archived state. Items in the active store are more readily available, while items relegated to the archive store are more difficult to access. For instance, an email message maintained in the active store may be presented to a user on a display (e.g., monitor), such that the user can easily access it (e.g., double clicking with a mouse). In the archive store, however, a user may be required to dig down through multiple archive files before being able to view a message, or only a link to an item stored offline may appear. Although common reference is made herein to email messages, in accordance with the invention, items can be of any type susceptible to inference. For example, the items can be e-mail, documents, web pages, news articles, images or sound recordings. Examples of images include medical images such as microscope images, MRI images, X-rays, fingerprints, works of art, and videos, such as might be taken by a robot going about a task. Examples of sound recordings include music recordings and voice recordings.

The inference system 110 is operatively coupled to a property log 150 adapted to store information relating to items, users and extrinsic data. For email messages, for example, item information contained in the log 150 may include, among other things, data revealed within email headers, such as the title/subject matter of the message, context (e.g., when/where/how/circumstances under which it was created), message priority (e.g., whether it is urgent or of normal importance), the size of the message, whether there are any attachments and who sent the message (e.g., an employer or an unknown entity that may send out unsolicited junk mail). User related information maintained in the log may include name, age, title, job description, current medium/environment being utilized (e.g., office PC, car phone, personal digital assistant "PDA"), the time, date and frequency of access to one or more messages, and user preferences gathered from implicit evidence obtained by monitoring user activity. Extrinsic data in the log may include, but is not limited to, current date/time, news, headlines, holiday calendar dates, sporting events/announcements.

Figure 2:
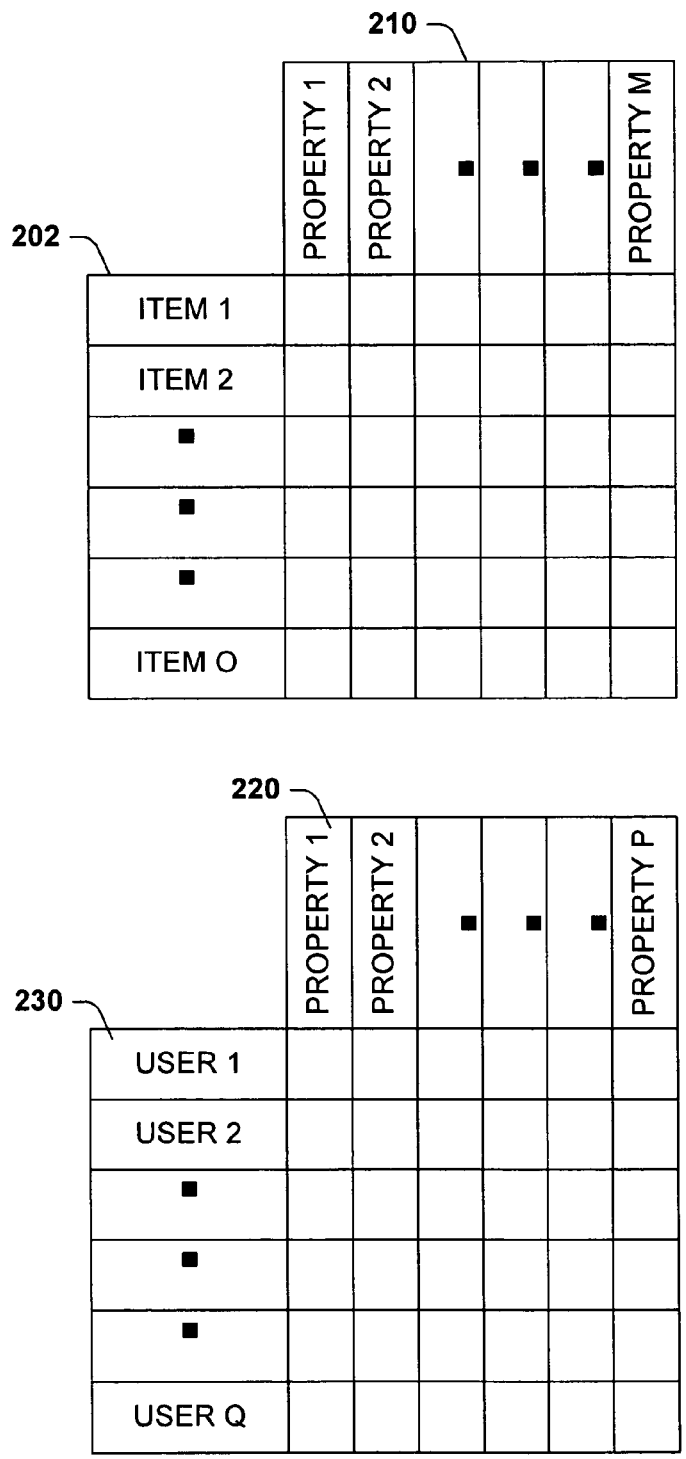
FIG. 2 is a schematic diagram illustrating tables of information that may be stored in a property log in accordance with an aspect of the present invention.

As shown in FIG. 2, some of this information may be stored in a tabular or grid-like format in the property log. More particularly, properties 210 numbered 1 through M can be maintained for items 202 numbered 1 through O (M and O being integers). Similarly, properties 220 numbered 1 through P can be stored for users 230 numbered 1 through Q (P and Q being integers). As time goes on, entries within the log can be refreshed. For example, the number of times that a particular user accesses a certain item can be updated over time. Similarly, the medium that a user is engaged with can be refreshed over time (e.g., where the user switches from his/her office PC to a car phone).

With reference back to FIG. 1, the inference system 110 is operable to utilize the information relating to items 102, users and/or extrinsic data 104 to infer how to store items. The inference system does this, in part, by determining probabilities associated with items. More particularly, a probability component 112 of the inference system 110, calculates the likelihood that a user will access the items by applying the information through one or more probabilistic techniques. This can be expressed and read as:

p (access|E); the probability that a user will access the item given some evidence.

The probabilistic techniques employed may include, but are not limited to, neural networks, naïve Bayesian processing, sophisticated Bayesian processing, similarity analysis employing dot product and/or cosine function processing and decision tree processing. By determining the likelihood that a user will access an item, the probability component 112 derives a metric indicative of the item's utility.

With continuing reference to FIG. 1, the probability component 112 is operatively coupled to a cost-benefit component 114 of the inference system. The cost-benefit component 114 is operative to calculate a value density based upon a determined probability and size of an item. As such, the value density is a measurement of the relative worth of an item given its size. More particularly, the value density measures the overhead attributed to keeping the item active versus the gains associated with having quick and easy access to the item. The value density can be expressed and read as:

$$\text{value density} = \frac{p(\text{access} \mid E)}{\text{item size}};$$

the ratio of probability of user access and item size.

The inference system 110 can then utilize, among other things, determined probabilities and value densities to decide what to do with items or approximate orderings. By way of example, one or more rules can be utilized in the inference system. One such rule may indicate that an item should be moved into the archive item store 130 if its determined value density is below some threshold value. It is to be appreciated, however, that archiving rules can be applied to factors other than determined value densities. The use of value densities for ordering is but one approximation for choosing the best arrangement of items to store in a limited space. The inference system is operative to utilize any suitable number of methodologies and/or models to infer what do with items. Additional criteria may also be utilized to control other aspects of items, such as the manner within which an item is presented. For instance, if user related properties reveal that the user is utilizing a PDA to access email messages, then the messages may be presented in a PDA ready format (e.g., appropriately reduced resolution).

By way of further illustration, the inference system can be configured to make decisions as to whether an item is likely to be accessed only a single time and, if so, to brand that item as a "one-shot" item. To mitigate inefficient use of space, a one-shot item can be archived or discarded once it is accessed. In accordance with the present invention, the inference system 110 can examine items 102, extrinsic data 104 and/or information stored in the property log 150 to surmise whether an item should be regarded as a one-shot item. For example, the system may infer that a short reply message, such as "see you later" that does not include any attachments, is sent by someone with whom the user frequently corresponds and which is sent in response to user initiated dialog should be considered a one-shot message. Alternatively, the system may deduce that an email message which is sent from a user's employer and which includes one or more attachments should not be regarded as a one-shot message.

Determined probabilities and/or value densities can be evaluated to gauge the status of an item. For instance, the results of a probabilistic determination can be compared to a threshold probability. If the determined probability is less than the threshold probability (meaning that it is rather unlikely that a user will access the item), then an inference can be made that the item is a one-shot item. Similarly, a determined value density can be compared to a threshold value density. If the determined value density is below the threshold value density, an inference can be made that the item is a one-shot item.

It is to be appreciated that temporal changes can be accounted for in the present invention. By leveraging notions of temporal sensitivity of the likelihood that an item will be needed in the future, determined values and inferences can be dynamically updated over time. For instance, the probability component 112 can continually recalculate probabilities of items as new items become available and as information in the log 150 changes and is updated. The cost-benefit component 114 then utilizes current probabilities to determine contemporary value densities. Ongoing inferences can then be made about what to do with items. For instance, inferences can continually be made about whether items should be regarded as one-shot items. An item may, for example, be considered a one-shot item based upon a rate of decay or once its determined probability falls below some threshold probability within a predefined period of time (e.g., five minutes). After an initial read, an email message may have a probability of being accessed again that, given the evidence and/or conditions, is adjusted downward to such a degree that it falls below some threshold value and should be archived after the initial read. Similarly, an item may be regarded as a one-shot item if its determined value density drops below some threshold probability within a predefined period of time. The process can start when a message is received wherein an initial probability of access is determined and then decays over time.

Figure 3:
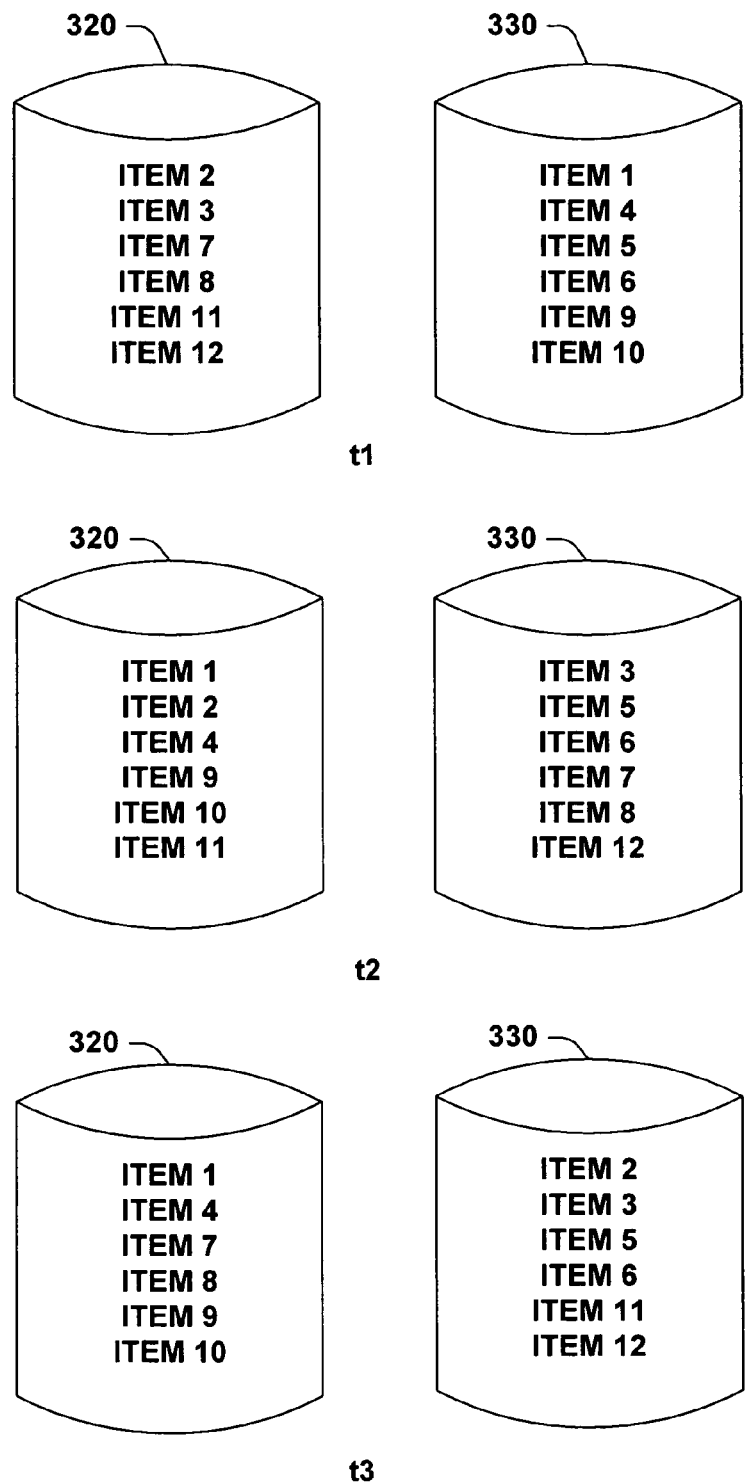
FIG. 3 is an illustration of assortments of items stored in active and archive item stores at different times, namely t1, t2 and t3 in accordance with an aspect of the present invention.

An exemplary effect of the system over time is illustrated in FIG. 3, wherein, at a first time t1, items 2, 3, 7, 8, 11 and 12 are stored in an active item store 320 and items 1, 4, 5, 6, 9 and 10 are maintained in an archived item store 330. At time t2, however, items have been rearranged based upon inferential determinations over time such that the active item store 320 contains items 1, 2, 4, 9, 10 and 11 and the archived item store 330 contains items 3, 5, 6, 7, 8 and 12. At time t3, the items have again been shuffled in accordance with temporally adjusted determinations such that items 1, 4, 7, 8, 9 and 10 are included in the active item store 320, while items 2, 3, 5, 6, 11 and 12 are positioned in the archived item store 330. It is to be appreciated that, in addition to storing items, the present invention contemplates discarding and/or recalling items.

Figure 4:
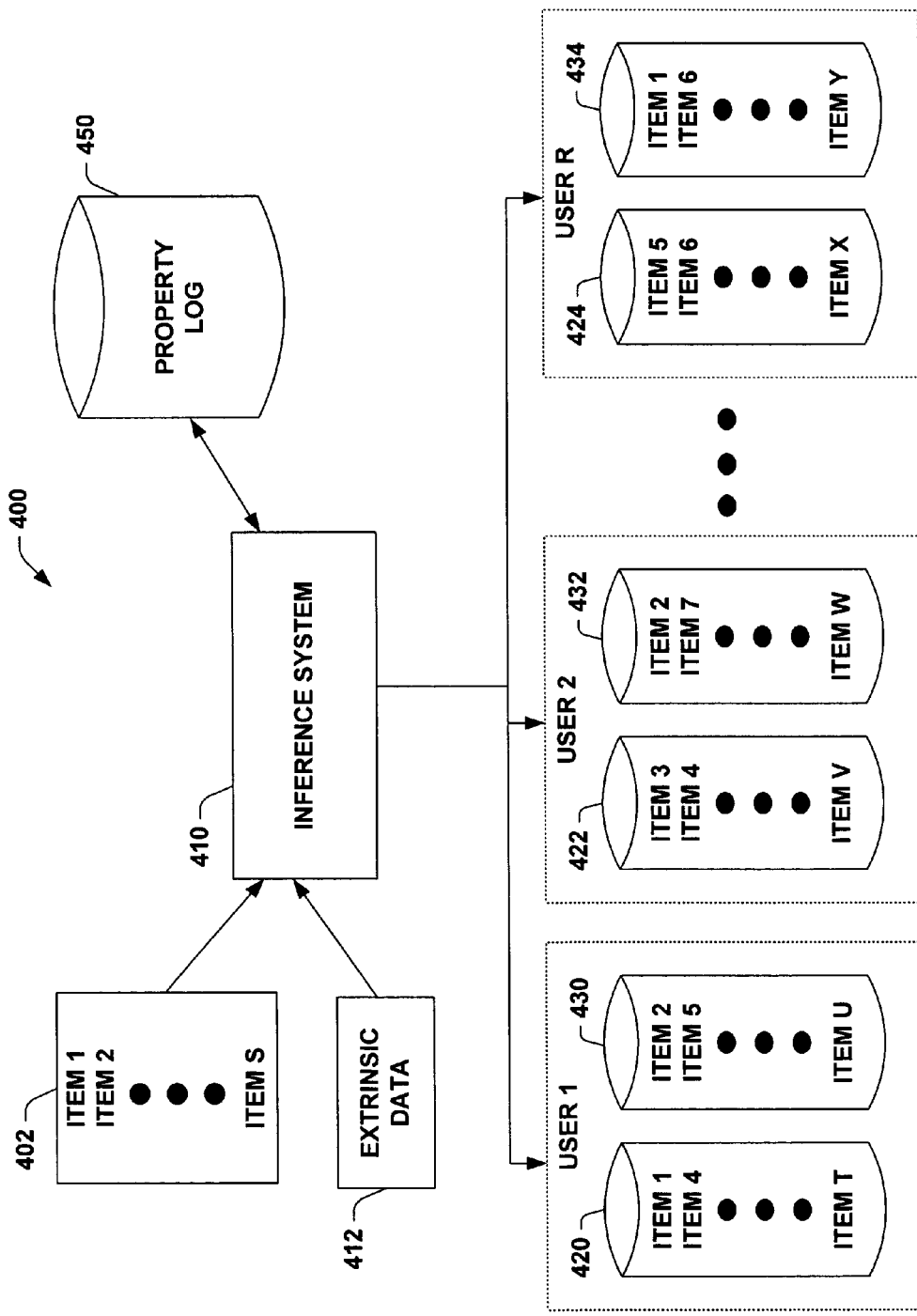
FIG. 4 is a schematic diagram illustrating a system in a networked environment that provides for inferring whether to actively store items for multiple users in accordance with an aspect of the present invention.

With reference now to FIG. 4, it is to be appreciated that the present invention has application to networked environments wherein R number of users may receive and/or have access to S number of items 402 (R and S being integers). The inference system 410 can determine how individual users would like to store the items. In this manner, the number of items stored as active can be streamlined on a user by user basis such that ease of review, access and searching of documents is facilitated. In the example illustrated, for user 1, items 1, 4 through T are stored in an active item store 420 and items 2, 5 through U are stored in an archived item store 430. In the same manner, for user 2, items 3, 4 through V are stored actively 422, while items 2, 7 through W are archived 432 and for user R, items 5, 6 through X are actively stored 424, while items 1, 6 through Y are archived 434 (T-Y being integers). It is to be appreciated that, while separate active and archived item stores are depicted, user based selections of items may be stored in a single active item store and a single archived item store (120, 130, FIG. 1). It is also to be appreciated that user specific selections can be updated over time. Although not shown, at a later point in time, for instance, the items may be rearranged on a user by user basis such that items 2, 7 through B, 4, 6 through C and 3, 4 through C are stored actively, while items 4, 5 through E, 5, 8 through F and 1, 9 through G are archived for users 1, 2, and R, respectively (B-G being integers).

Figure 5:
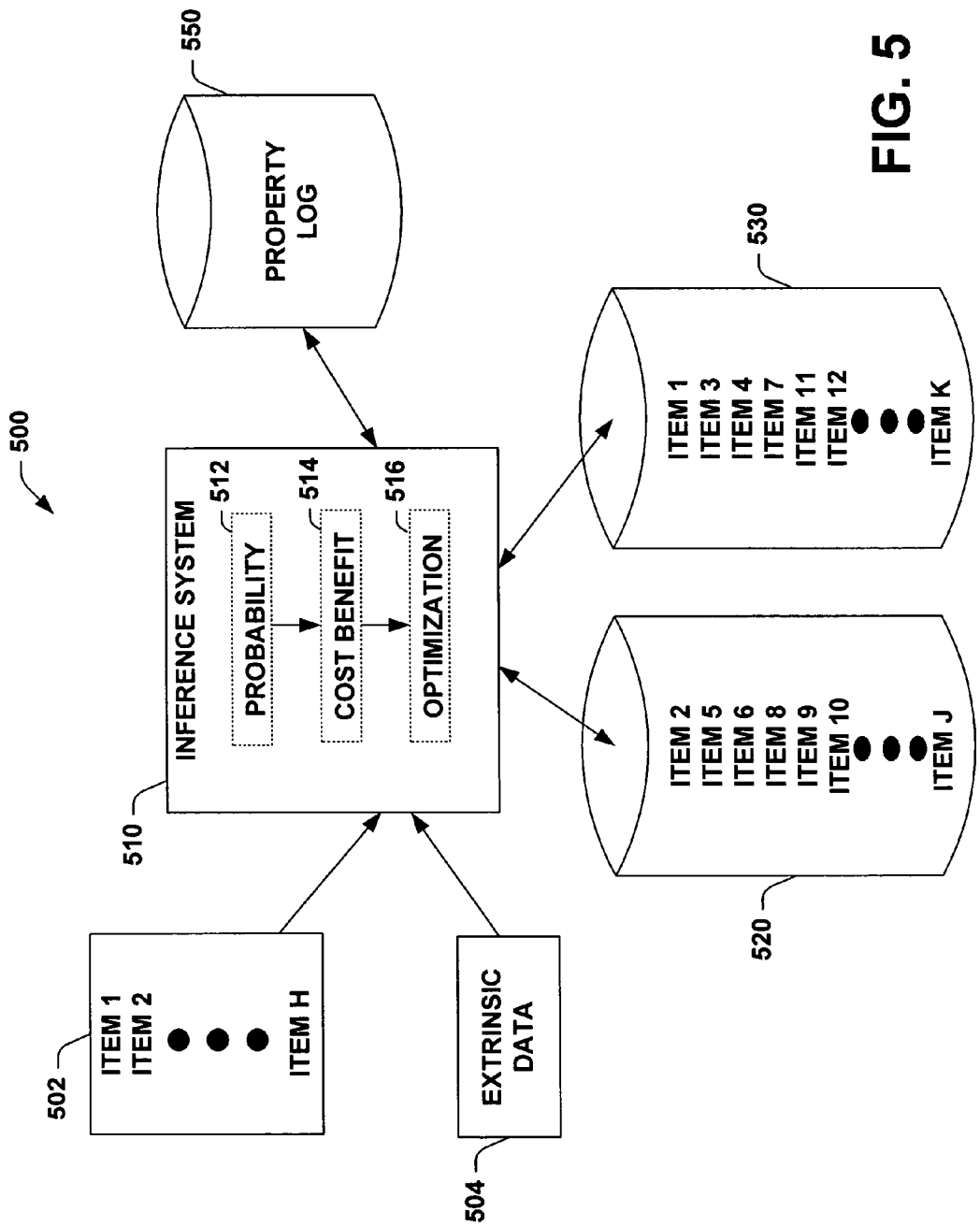
FIG. 5 is a schematic diagram illustrating a system that provides for inferring whether to actively store items and to optimize usage of active space in accordance with an aspect of the present invention.

With reference now to FIG. 5, in accordance with another aspect of the present invention, an optimization component 516 is included within an inference system 510. The optimization component 516 mitigates difficulties associated with storing a plurality of items 502 numbered 1 through H in a limited amount of active space (H being an integer). More particularly, where several items are important enough to be maintained in an active item store 520, the optimization component 516 is operable to decide the best or most useful assortment of items. In operation, the optimization component may employ the use of utility directed knapsack methodologies in its computations. Determined value densities and the amount of active space available are but some of the factors that may be considered by the optimization component. In particular, value density to do an ordering is but one approximation of the knapsack algorithm for choosing the best items of different sizes and values into a limited space (e.g., limited memory). Approximation has certain guarantees on optimality (e.g., value no less than 0.5 optimal), but improvements can be achieved with more computational resources, e.g., employ a complete search (intractable) or limited search (more tractable) to find a best fit. Furthermore, it should be appreciated that the general knapsack problem of putting in items of different values and sizes has not been applied to the challenges noted herein with respect to the subject invention. Accordingly, in the example illustrated in FIG. 5, both a cost-benefit component 514 and active item store 520 are coupled to the optimization component 516. The optimization component obtains valued densities from the cost-benefit component 514 and the amount of active space available from the active item store 520.

A probability component 512 is also shown in the inference system 510. The probability component 512 is operative to apply information about the items 502, users and extrinsic data 504 to probabilistic techniques to determine the likelihood that an item will be accessed. The probabilistic techniques employed may include, but are not limited to, neural networks, naïve Bayesian processing, sophisticated Bayesian processing, similarity analysis employing dot product and/or cosine function processing and decision tree processing. The probability component 512 may obtain some of this information from a property log 550 that stores such information. The cost-benefit component 514 utilizes determined probabilities from the probability component 512 and item size to calculate respective value densities of items.

The optimization component 516 determines if all of the items worth storing in the active space will actually fit within that space. Items typically warrant storage in active space if their value densities are above some predefined threshold. To determine if these items will fit within the active item store, the optimization component 516 is operative to manipulate metrics in any suitable manner, such as by adding their respective sizes. The optimization component 346 can then compare this sum to the size of the active item store. If all of the items will not fit within the active item store, the optimization component can assess which items to relegate to an archive item store or discard. The optimization component 516 can make this determination in any of a variety of ways. For example, the optimization component 516 may be adapted to find the arrangement of items that will maximize the total value density (e.g., the assortment of items have value densities that, when summed, yield a maximum value). To effect this, the optimization component can begin storing the items that have the greatest value densities in the active space 520. This can be done in a sequential manner until the next item in queue will not fit within the active space. The remaining qualifying items can then be moved to the archive item store 530 or discarded.

To further mitigate the inefficient use of the active space, the optimization component can also examine the remaining items (e.g., those items that have value densities above some predefined threshold, but are not stored in the active space). If any of these items will fit within the residual amount of active space, they can be stored accordingly. In this manner, the number of actively stored items is streamlined to facilitate ease of review, access and searching of items.

In the example illustrated in FIG. 5, items numbered 2, 5, 6, 8, 9, 10 through J are shown in the active space 520 (J being an integer). Presumably, this is the collection that best mitigates the inefficient use of active space. For example, as discussed above, this may be the arrangement of items that, when summed, yields a maximum value density. This grouping may also include one or more remaining items that just fit within the residual active space. For instance, the sum of items 2, 5, 6, 8, 9, 10 may yield a maximum value density, while remaining item J may include a smaller item that just fits into the active item store. Items numbered 1, 3, 4, 7, 11, 12 through K are shown as being stored in the archived item store 530 (K being an integer). This set contains those items that are not useful enough (e.g., do not have sufficient value densities) to be stored in active space. It may also include one or more items that warrant being stored in active space, but will not fit within the remaining active space. For instance, items 11 and 12 may have been the next items in queue, but had to be relegated to the archive.

It is to be appreciated that temporal changes can be accounted for such that the active space can be utilized efficiently over time. To do so, the probability component 512 continually updates or recalculates respective probabilities of items as new items are added and/or as information is updated in the property log. The cost-benefit component 514 can then utilize these probabilities to determine contemporary value densities. With updated value densities, the optimization component 516 can constantly re-arrange the items that are stored in the active space 520 and the archive 530.

Figure 6:
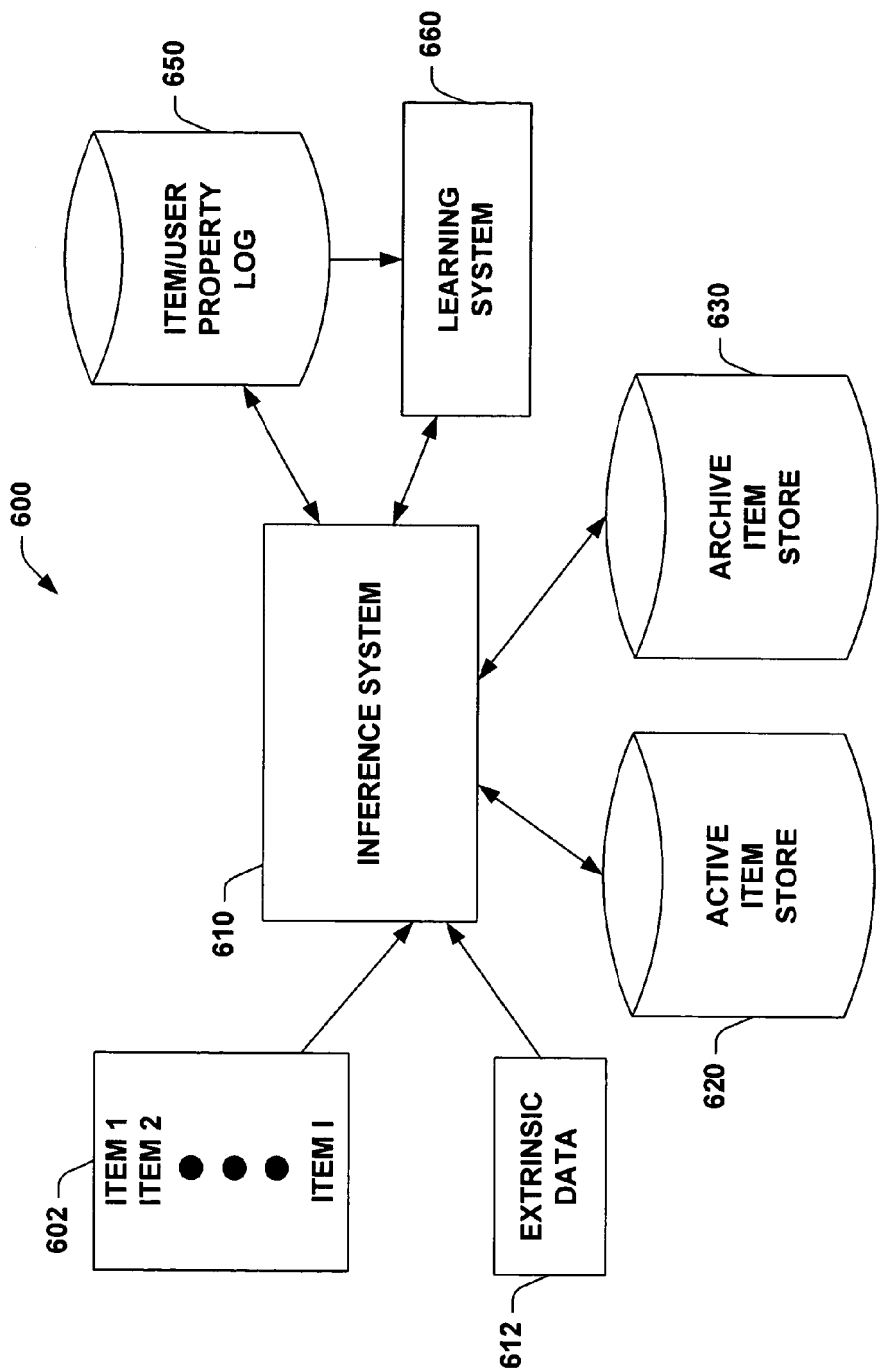
FIG. 6 is a schematic diagram illustrating a system that includes a learning component operable to adjust inferences regarding whether to actively store items in accordance with an aspect of the present invention.

Turning to FIG. 6, a learning component 660 may be operable to act on an inference system 610 and affect decisions made thereby. The learning system 660 can employ manual and/or automated means to analyze information relating to items 602, users and extrinsic data 612, some of which may be obtained from a property log 650. Conditional probabilities including, but not limited to, Bayesian statistical analysis can be utilized by the learning system. Results from computations performed by the learning system can be utilized to create and/or adapt decisions made by the inference system. The learning system 660 can operate continually such that one or more inferences about how to store items evolve over time. For example, the manner within which the inference system 610 recognizes one-shot items can be updated as the learning system observes user activity and notes the items that are accessed only once and the circumstances surrounding such activity, including information stored in the log 650.

Figure 7:
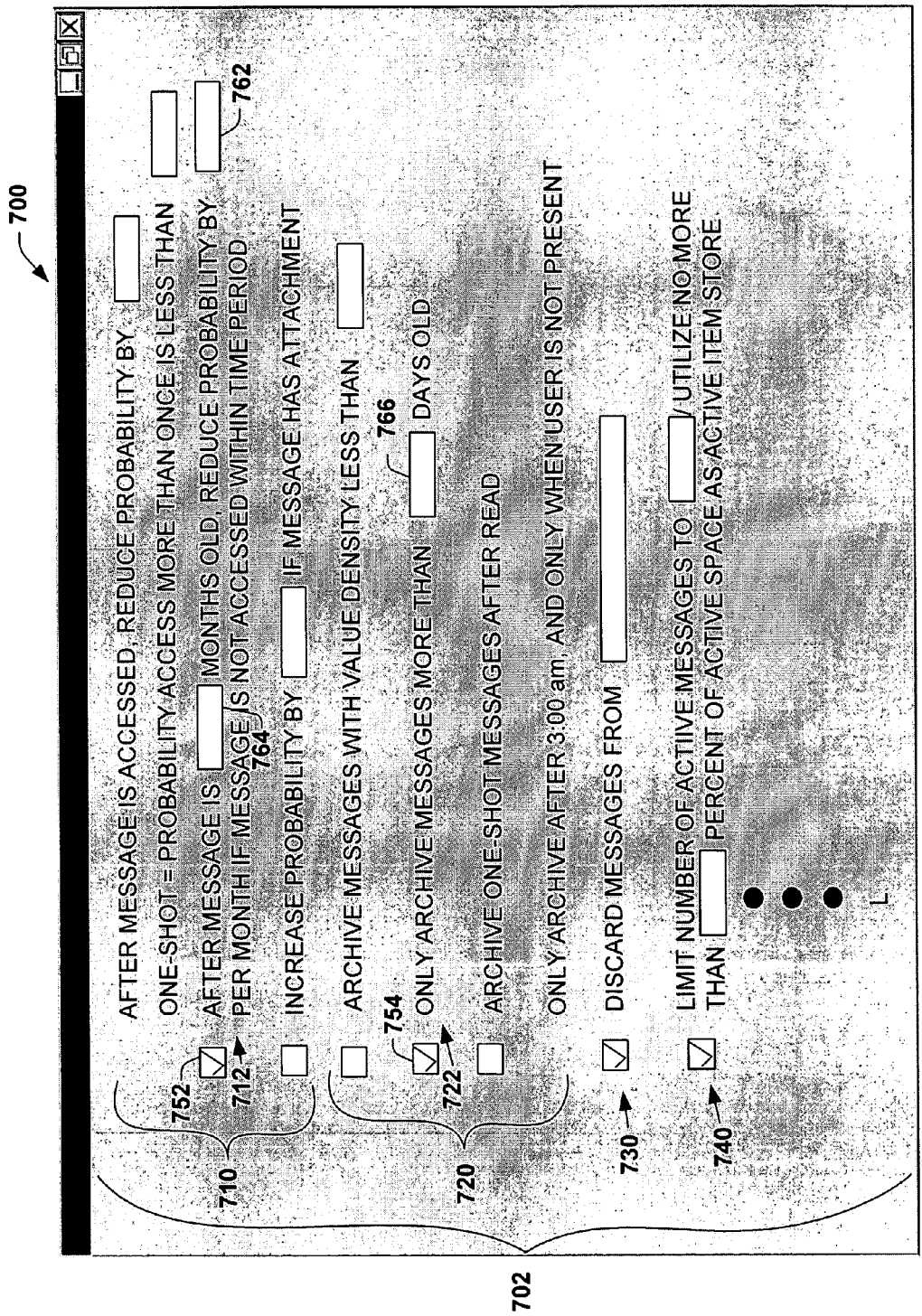
FIG. 7 is an illustration of an interactive user interface (UI) in accordance with an aspect of the present invention.

Turning now to FIG. 7, an interactive user interface (UI) 700 in accordance with an aspect of the present invention is illustrated. The UI 700 allows a user to personalize how items are stored. In the example shown, the UI is adapted to display L number of conditions 702 that affect how items are to be handled (L being an integer). Some of the entries are policies 710 that affect probabilistic determinations. Other entries are archiving rules 720. Still others 730, 740 regard item discard and memory utilization protocols, respectively. The UI is interactive in that it provides for user enablement/disablement and/or customization. More particularly, in the example shown, activation boxes are included. A user can click a mouse on these boxes to enable/disable the corresponding entries. For instance, activation box 752 next to the second policy 712 is checked. In this fashion, the second policy has been enabled and the probability will, therefore, be reduced by a certain amount after a user definable period of time passes during which the message is not accessed. Similarly, box 754 next to the second archiving rule 722 is checked. Accordingly, the second archiving rule has been enabled and therefore a message will only be archived once it exceeds a certain age. The UI also includes entry boxes that enable a user to configure entries. For instance, a user can type a value into entry box 762 to specify the degree to which the second policy should reduce the probability based upon the age of the message. The age itself is also user definable via box 764. Likewise, a user can type a value into box 766 to customize the second rule. It is to be appreciated that not all of the policies need to have the capability to be enabled/disabled and/or customized by a user. For instance, the third rule 724 shown in FIG. 7 is a firm rule that can neither be enabled/disabled nor customized. Although activation and entry boxes are illustrated, the present invention contemplates any suitable number and/or type of user interface elements (e.g., slide bar elements, drop down menus, dials, buttons, speech input/output elements). Additionally, it is to be appreciated that any suitable number of entries can be incorporated into a UI, such as that shown in FIG. 7. For instance, there are different manners in which to specify goals of an archiving system—per user preferences, and thresholds, cost-benefit analyses, and specifications about free space (e.g., "leave at least x megs of free space in the active store", "archive any item with less than a p(access again|E) of 0.05", "archive any item with less than a value density of less than 0.1").

Figure 8:
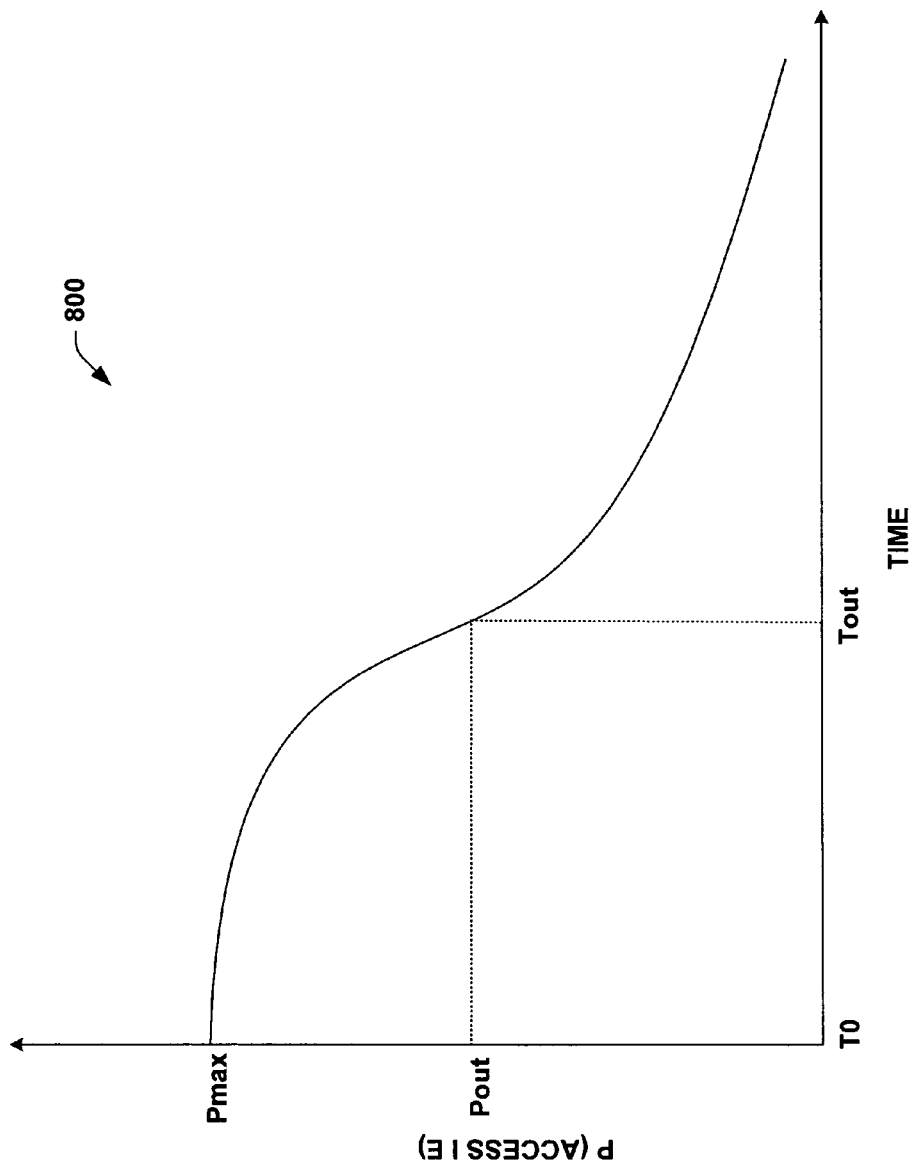
FIG. 8 is a curve illustrating the probability that a user will access an item over time.

Turning now to FIG. 8, since the present invention contemplates temporal sensitivity, a plot 800 of the probabilistic determination for an item is illustrated over time. In the graph, the probability that the item will be accessed given some evidence is plotted on the Y-axis and time is plotted on the X-axis. The probability curve is illustrated as decaying over time. The curve is drawn in this manner because empirical testing has provided support for the proposition that items become less useful over time and thus it is less likely that an item will be accessed as time goes on. Accordingly, at time T0, which is the first instance of the item, the probability that a user will access the item is at a maximum value, namely Pmax. At this point, the probability is, in all likelihood, high enough to warrant maintaining the item in an active state. As time goes on, however, the likelihood that the item will be accessed decreases. Thus, at some later point in time, namely Tout, the probability that a user will access the item decreases to a value, namely Pout, where it is no longer warranted to maintain the item in an active state. At Pout, the probability is at a level that, considering the size of the item, the value density is likely below some threshold level. At this point, an inference system may determine that the item no longer qualifies for storage in active space. In this fashion, the item can be aged out of an active item store. The curve shown in FIG. 8 schematically represents modeling p(access>1) where T0 starts at the time a message is first read.

Figure 9:
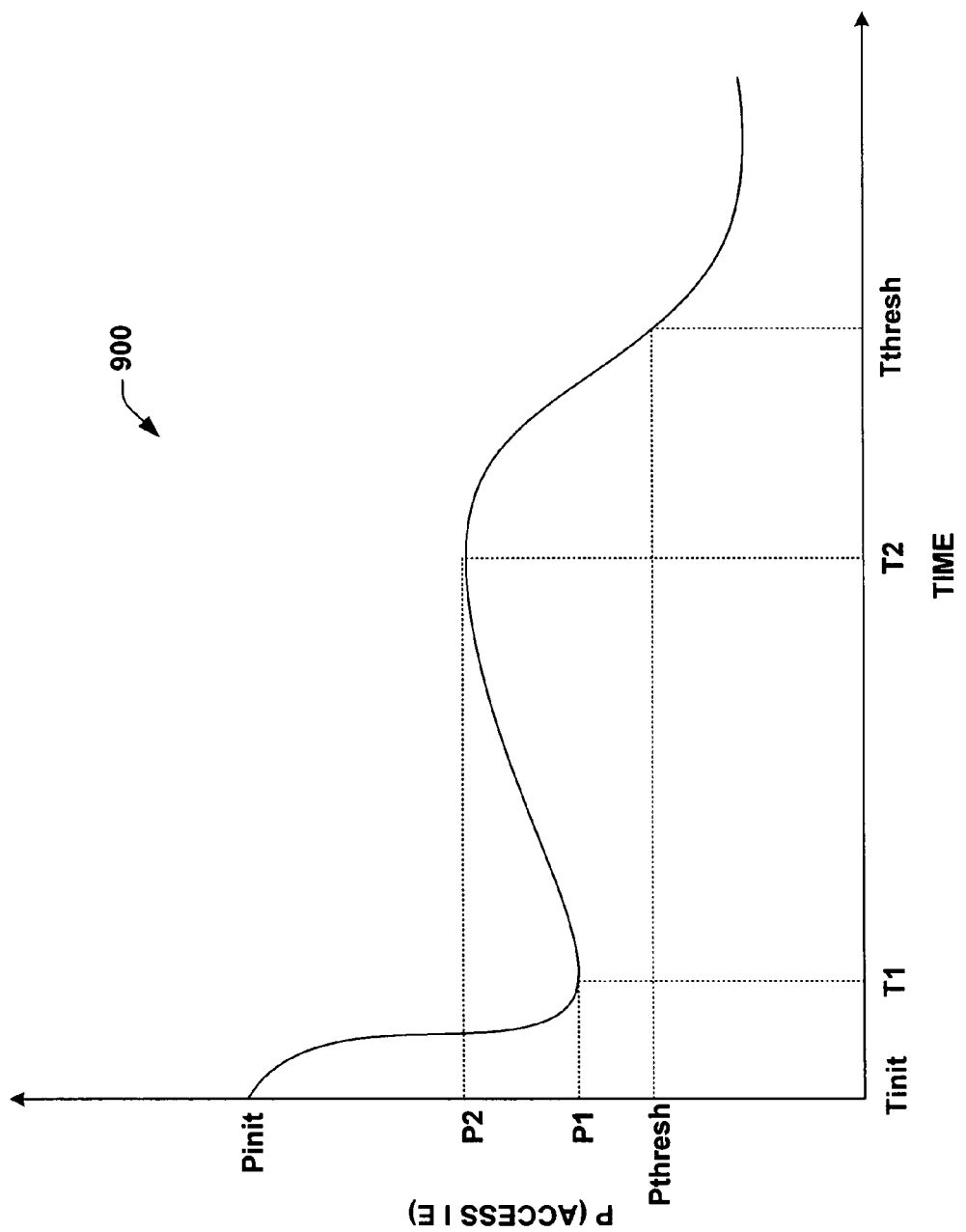
FIG. 9 is an alternative curve illustrating the probability that a user will access an item over time.

With reference now to FIG. 9, a slightly different probability versus time curve 900 is shown. While the curve generally shows a decaying probability over time, some notable changes in the probability are also reflected. The curve initially has a probability Pinit at time Tinit. The probability then drops rather suddenly from Pinit to P1 in a relatively short period of time, namely from Tinit to T1. This may correspond to the situation where an email message is accessed and reviewed by a user shortly after it is received. The degree to which the probability drops is a function of the policies in place and information regarding the item, user and extrinsic data. For example, if the message is a short reply message, such as "see you later" which is sent by someone with whom the user frequently corresponds and which is sent in response to user initiated dialog, the policies in place may cause the probability of that message to drop significantly after the message is accessed a first time. Alternatively, however, the situation is also illustrated in the curve wherein the probability increases slightly over time, namely from probability P1 at time T1 to probability P2 at time T2. This may, for example, occur where the email message is re-accessed several times by a user and the policies are configured to reflect the premise that where a message is re-accessed several times, the probability that the user will again re-access the message increases over time. This may be the case, for instance, where the email message contains a code and/or password. A user may repeatedly access the email message to retrieve the code and/or password until he/she has it memorized. After the user has the code and/or password memorized, the message is no longer re-accessed by the user, and therefore, the probability will be reduced over time. Thus, the probability subsequently falls to some value, namely Pthresh at time Tthresh, wherein it no longer warrants being maintained in active memory. At this point, the item can be aged out and archived or discarded. The curve shown in FIG. 9 could also apply to an item already in the archive whose probability of being accessed again is updated over time. For example, certain items—even those stored offline, might increase in p(access again|E) where interest of user is learned with respect to a particular topic(s), via aged email. Updates can continually be reviewed to facilitate making decisions about whether to bring back items into the active store from the archive.

Figure 10:
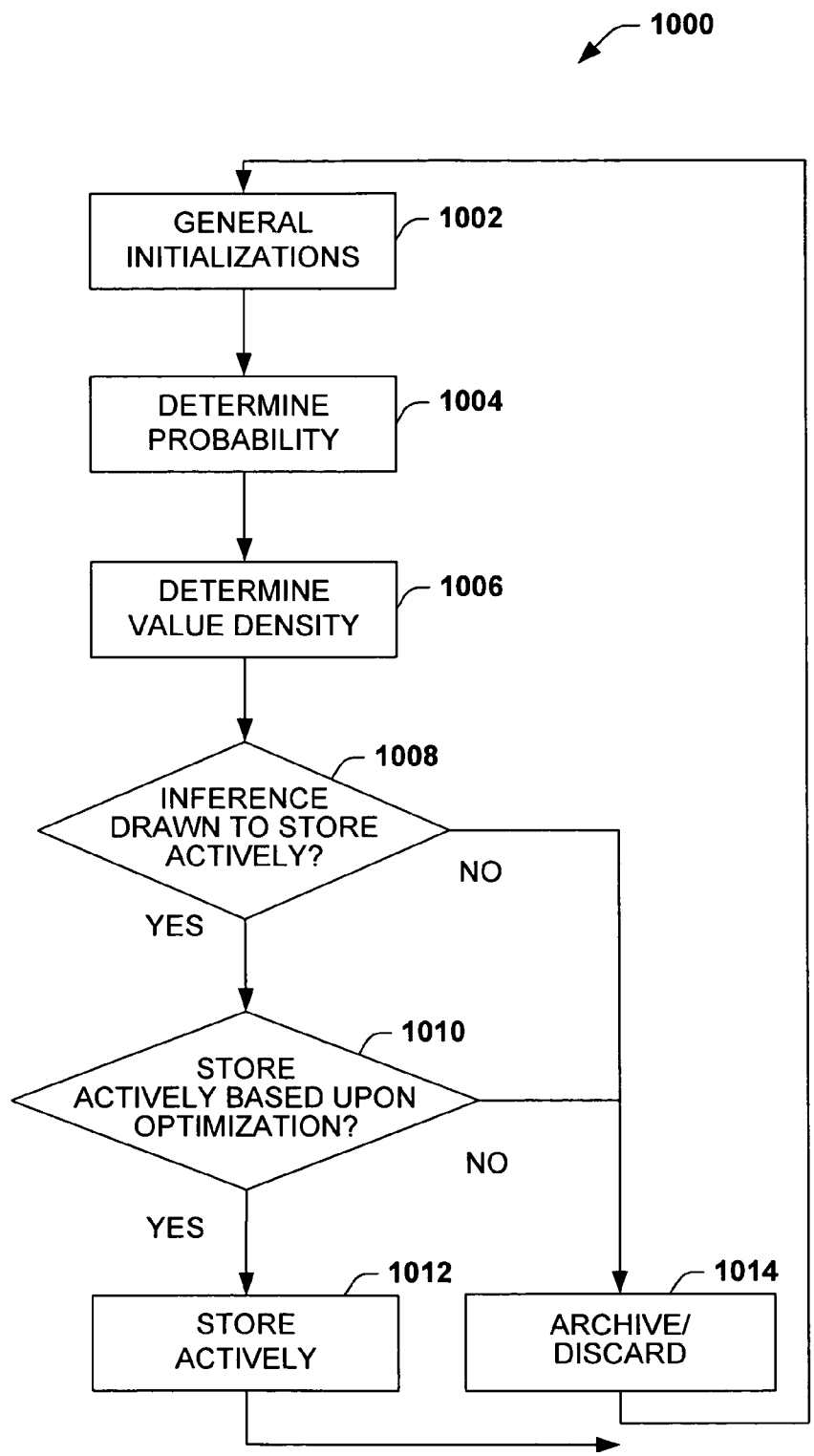
FIG. 10 is a flow diagram illustrating a methodology to infer whether to actively store an item in accordance with an aspect of the present invention.

In view of the foregoing graphical, structural and functional features described above, a methodology in accordance with various aspects of the present invention will be better appreciated with reference to FIG. 10. While, for purposes of simplicity of explanation, the methodology of FIG. 10 is shown and described as occurring serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodology may be implemented as computer-executable instructions, such as software stored in a computer-readable medium. Alternatively, the methodology may be implemented as hardware or a combination of hardware and software.

FIG. 10 illustrates a methodology 1000 for determining what to do with an item, and more particularly whether to archive or actively retain the item. The methodology begins at 1002 wherein general initializations occur. Such initializations can include, but are not limited to, allocating memory, establishing pointers, establishing data communications, acquiring resources, setting variables and displaying process activity. At 1004 a probability that the item will be accessed is determined based upon some evidence. The present invention contemplates that the evidence can include information about the item, user, and/or extrinsic data, where some of this information may be obtained from a property log. The probability that the item will be accessed is an indication of the relevance and utility of the item. After 1004, the methodology proceeds to 1006 wherein a value density is determined. The value density is a measurement of the worth of the item and may be determined by comparing the probability that the item will be accessed to the size of the item (which affects the amount of space the item will occupy). More particularly, the value density may be determined by finding the ratio of benefit of the item (measured in terms of the probability that the item will be accessed) to the cost of the item (measured in terms of the size of the item). After 1006, the methodology then proceeds to 1008 wherein an inference is drawn regarding how to store the item (e.g., actively or not). This may include an evaluation of whether or not the item is a one-shot item and may be based upon conditions, some of which may be personalized. If the item is to be stored actively, the methodology proceeds to 1010 where the item is put through an optimization protocol to ascertain if the item should be stored in active space given the relative worth of the item as compared to other items and the amount of space available. A customized allocation of fast memory may be considered in 1010. If it is determined that the item is to be stored in active space, the methodology proceeds to 1012 wherein the item is stored in an active item store. If the determination in 1008 or 1010 is negative, the process proceeds to 1014 wherein the item is archived or discarded. Since the present invention contemplates temporal sensitivity, after 1012 and 1014 the method returns to 1002 so that the process can continually reassess whether the item is to be stored within active or archival space.

Figure 11:
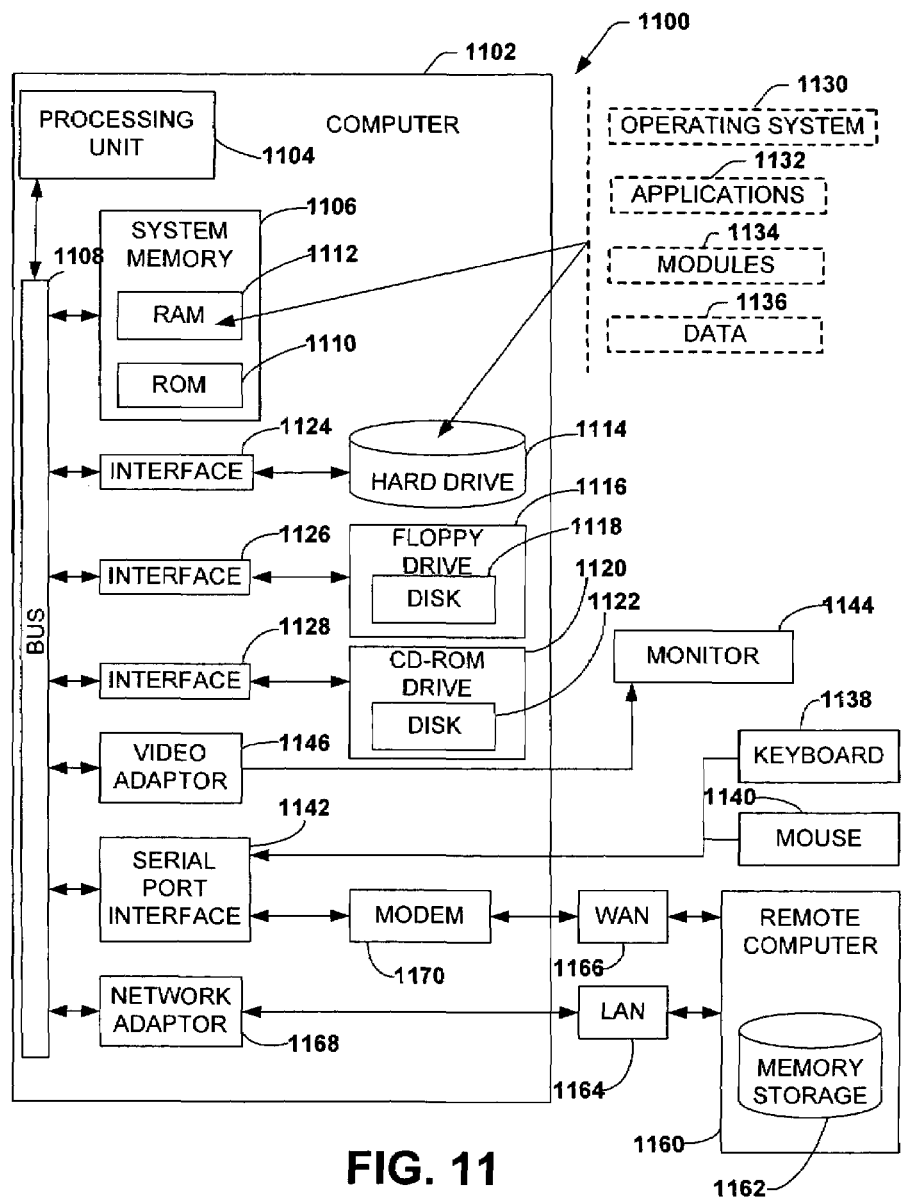
FIG. 11 is a schematic block diagram illustrating a suitable computing environment in accordance with an aspect of the present invention.

In order to provide additional context for various aspects of the present invention, FIG. 11 and the following discussion are intended to provide a brief, general description of one possible suitable computing environment in which the various aspects of the present invention may be implemented. It is to be appreciated that the computing environment is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 11 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 11, an exemplary system environment 1100 for implementing the various aspects of the invention includes a conventional computer 1102, including a processing unit 1104, a system memory 1106, and a system bus 1108 that couples various system components including the system memory to the processing unit 1104. The processing unit 1104 may be any commercially available or proprietary processor. In addition, the processing unit may be implemented as multi-processor formed of more than one processor, such as may be connected in parallel.

The system bus 1108 may be any of several types of bus structure including a memory bus or memory controller, a peripheral bus, and a local bus using any of a variety of conventional bus architectures such as PCI, VESA, Microchannel, ISA, and EISA, to name a few. The system 1100 memory includes read only memory (ROM) 1110 and random access memory (RAM) 1112. A basic input/output system (BIOS), containing the basic routines that help to transfer information between elements within the computer 1102, such as during start-up, is stored in ROM 1110.

The computer 1102 also may include, for example, a hard disk drive 1114, a magnetic disk drive 1116, e.g., to read from or write to a removable disk 1118, and an optical disk drive 1120, e.g., for reading from or writing to a CD-ROM disk 1122 or other optical media. The hard disk drive 1114, magnetic disk drive 1116, and optical disk drive 1120 are connected to the system bus 1108 by a hard disk drive interface 1124, a magnetic disk drive interface 1126, and an optical drive interface 1128, respectively. The drives and their associated computer-readable media provide nonvolatile storage of data, data structures, computer-executable instructions, etc. for the computer 1102. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment 1100, and further that any such media may contain computer-executable instructions for performing the methods of the present invention and or may contain components that are to be installed in accordance with an aspect of the present invention.

A number of program modules may be stored in the drives and RAM 1112, including an operating system 1130, one or more application programs 1132, other program modules 1134, and program data 1136. The operating system 1130 may be any suitable operating system or combination of operating systems.

A user may enter commands and information into the computer 1102 through one or more user input devices, such as a keyboard 1138 and a pointing device (e.g., a mouse 1140). Other input devices (not shown) may include a microphone, a joystick, a game pad, a satellite dish, a scanner, or the like. These and other input devices are often connected to the processing unit 1104 through a serial port interface 1142 that is coupled to the system bus 1108, but may be connected by other interfaces, such as a parallel port, a game port or a universal serial bus (USB). A monitor 1144 or other type of display device is also connected to the system bus 1108 via an interface, such as a video adapter 1146. In addition to the monitor 1144, the computer 1102 may include other peripheral output devices (not shown), such as speakers, printers, etc.

The computer 1102 may operate in a networked environment using logical connections to one or more remote computers 1160. The remote computer 1160 may be a workstation, a server computer, a router, a peer device or other common network node, and typically includes many or all of the elements described relative to the computer 1102, although, for purposes of brevity, only a memory storage device 1162 is illustrated in FIG. 5. The logical connections depicted in FIG. 11 may include a local area network (LAN) 1164 and a wide area network (WAN) 1166. Such networking environments are commonplace in offices, enterprise-wide computer networks, intranets and the Internet.

When used in a LAN networking environment, the computer 1102 is connected to the local network 1164 through a network interface or adapter 1168. When used in a WAN networking environment, the computer 1102 typically includes a modem 1170, or is connected to a communications server on the LAN, or has other means for establishing communications over the WAN 1166, such as the Internet. The modem 1170, which may be internal or external, is connected to the system bus 1108 via the serial port interface 1142. In a networked environment, program modules depicted relative to the computer 1102, or portions thereof, may be stored in the remote memory storage device 1162. It will be appreciated that the network connections shown are exemplary and other means of establishing a communications link between the computers 1102 and 1160 may be used.

In accordance with the practices of persons skilled in the art of computer programming, the present invention has been described with reference to acts and symbolic representations of operations that are performed by a computer, such as the computer 1102 or remote computer 1160, unless otherwise indicated. Such acts and operations are sometimes referred to as being computer-executed. It will be appreciated that the acts and symbolically represented operations include the manipulation by the processing unit 1104 of electrical signals representing data bits which causes a resulting transformation or reduction of the electrical signal representation, and the maintenance of data bits at memory locations in the memory system (including the system memory 1106, hard drive 1114, floppy disks 1118, CD-ROM 1122, and shared storage system 1110) to thereby reconfigure or otherwise alter the computer system's operation, as well as other processing of signals. The memory locations where such data bits are maintained are physical locations that have particular electrical, magnetic, or optical properties corresponding to the data bits.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program and a computer. By way of illustration, both an application running on a server and the server can be a component. Additionally, as used in this application, "system" is a structure comprising one or more modules. A "module" is a structure comprising computer hardware and/or software. For example, a module can be, but is not limited to, a computer readable memory encoded with software instructions or a computer configuration to carry out specified tasks. By way of illustration, both an application program stored in computer readable memory and a server on which the application runs can be module. Due to the nature of modules, multiple modules can be intermingled and are often not separated from one another. Systems can likewise be intermingled and inseparable. Likewise, it is to be appreciated that a module can be a software object.

It is to be appreciated that various aspects of the present invention may employ technologies associated with facilitating unconstrained optimization (e.g., example, back-propagation, Bayesian, Fuzzy Set, Non Linear regression, or other neural network paradigms including mixture of experts, cerebellar model arithmetic computer (CMACS), Radial Basis Functions, directed search networks, and functional link nets) may be employed.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system that facilitates maintaining an item, comprising:
    an inference component that inferentially determines whether to store the item in an active or archived state based at least in part upon:
        a probabilistic cost-benefit analysis to determine the item's worth by comparing an overhead cost attributable to storing the item in the active state versus a benefit associated with storing the item in the active state, the overhead cost determined based in part on the size of the item and the benefit determined at least in part by calculating a probability a user will access the item in the future;
        an assessment of the item's worth relative to the worth of other items actively stored, wherein the item is stored in the active or archived state according to the assessment of the item's relative worth;
        an assessment of the number of times the item is likely to be accessed by the user, wherein an item that is unlikely to be viewed more than once is stored in the active state until viewed by the user; and at least one of an archiving rule or a policy that affects the probabilistic cost-benefit analysis, the at least one archiving rule or policy is customized by a user; and an optimization component that determines an arrangement of items in the active state to maximize a total value density of the items in the active state, the value density for the item is determined based upon determining the probability a user will access the item divided by a total size of the item, wherein a memory operatively coupled to a processor retains at least one of the inference component or the optimization component.

2. The system of claim 1 further comprising:
a property log that stores user preferences gathered from implicit evidence obtained by monitoring user activity, the inference system consulting the property log when making an inferential determination.

3. The system of claim 2 being temporally sensitive such that information stored in the property log is updated over time.

4. The system of claim 1, the inference system utilizing a value density of the item to perform the cost-benefit analysis.

5. The system of claim 1 further comprising:
a learning system that acts upon the inference system to modify inferences based upon at least one of: a property of the item and a property of the user.

6. The system of claim 5 wherein the inference system employs a knapsack packing analysis to optimize items stored in the active state.

7. The system of claim 1 being temporally sensitive such that the item's worth is updated over time.

8. The system of claim 1 further comprising an interactive user interface.

9. The system of claim 8 wherein the interactive user interface comprises a selection element to allow a condition to be enabled/disabled.

10. The system of claim 9 wherein the interactive user interface further comprises an entry element to allow a condition to be configured.

11. The system of claim 1, wherein the system operates in a networking environment.

12. A computer implemented method for determining how to store a plurality of items comprising:
determining respective item utilities through probabilistic computations; determining respective item value densities in accordance with a probability of future item access and item size, the value density is the probability of user access of the item divided by the total size of the item;
assessing a worth of one or more items relative to at least one other of the plurality of items utilizing the item utilities and item value densities;
inferring whether to remove one or more of the plurality of items from active memory based upon the one or more items' worth relative to at least one other of the plurality of items;
determining which items to retain in the active memory when the active memory is full based on a comparison of the value densities of two or more items in the active memory;
removing one or more items from active memory according to the inference;
classifying an item stored in active memory as a one-shot item based on the number of times the item is likely to be accessed by a user,
removing the one-shot item from the active memory once the one-shot item is viewed by the user; and enabling a user to personalize how items are stored by customizing at least one of an archiving rule or a policy that affects the probabilistic computations.

13. The computer implemented method of claim 12 further comprising:
updating item utilities over time.

14. The computer implemented method of claim 13 further comprising:
determining modern value densities based upon updated item utilities.

15. The computer implemented method of claim 14 further comprising:
making contemporary inferences from at least one of: updated utilities and modern value densities.

16. The computer implemented method of claim 15 further comprising:
mitigating inefficient use of active space by applying a knapsack computation to the modern value densities.

17. The computer implemented method of claim 12 further comprising:
learning how to adjust inferences based upon at least one of: updated log information, probabilities and value densities.

18. A utility based item archiving system comprising:
means for determining a utility of an item, the utility determined at least in part by calculating a probability a user would prefer the item stored in a fast memory;
means for determining one or more costs associated with storing the item in the fast memory, at least one cost relating to the size of the item;
means for determining a relative worth of the item, the means for determining a relative worth comparing the utility and one or more costs of the item to that of at least one other item;
means for inferring whether to store the item in the fast memory or in an archival memory based upon the relative worth of the item;
means for classifying an item stored in the fast memory as a one-shot item based on tile number of times the item is likely to be accessed by a user, and
means for removing the one-shot item from the fast memory once the one-shot item is viewed by the user; and
means for enabling a user to customize at least one of an archiving rule or a policy that affects the probability calculation;
means for determining an arrangement of items in the fast memory to maximize a total value density of the items in the fast memory, the value density for the item is determined based upon determining the probability a user will access the item divided by a total size of the item, wherein a memory operatively coupled to a processor retains at least one of the means.

19. The system of claim 18, wherein the system operates in a networking environment.

* * * * *